US009978291B2

United States Patent
Schneider et al.

(10) Patent No.: US 9,978,291 B2
(45) Date of Patent: May 22, 2018

(54) LABEL, ESPECIALLY FOR A REUSABLE CONTAINER

(71) Applicant: CCL LABEL MEERANE GMBH, Meerane (DE)

(72) Inventors: Steffen Schneider, Oederan (DE); Harry Johlke, Bad Toelz (DE)

(73) Assignee: CCL LABEL MEERANE GMBH, Meerane (DE)

( * ) Notice: Subject to any disclaimer, the term of this patent is extended or adjusted under 35 U.S.C. 154(b) by 857 days.

(21) Appl. No.: 14/467,465

(22) Filed: Aug. 25, 2014

(65) Prior Publication Data
US 2014/0360658 A1 Dec. 11, 2014

Related U.S. Application Data

(63) Continuation of application No. 13/061,998, filed as application No. PCT/EP2009/061351 on Sep. 2, 2009, now abandoned.

(30) Foreign Application Priority Data

Sep. 3, 2008 (DE) .................. 10 2008 045 547

(51) Int. Cl.
 *G09F 3/02* (2006.01)
 *G09F 3/04* (2006.01)
 (Continued)

(52) U.S. Cl.
CPC .............. *G09F 3/0291* (2013.01); *B32B 7/12* (2013.01); *B32B 27/08* (2013.01); *B32B 27/302* (2013.01);
(Continued)

(58) Field of Classification Search
USPC ... 156/84, 86, 160, 163, 247, 249, 701, 709, 156/710, 711; 428/34.9, 343, 354
See application file for complete search history.

(56) References Cited

U.S. PATENT DOCUMENTS 5,096,767 A  3/1992 Harada et al.
5,223,315 A  6/1993 Katsura et al.
(Continued)

FOREIGN PATENT DOCUMENTS

DE  202004002207 U1  7/2005
DE  202007017059 U1  4/2008
(Continued)

OTHER PUBLICATIONS

Notice of Reasons for Rejection cited in Application No. 2011-525539 dated Dec. 18, 2012, 5 pages.
(Continued)

*Primary Examiner* — Sing P Chan
(74) *Attorney, Agent, or Firm* — Rothwell, Figg, Ernst & Manbeck, P.C.

(57) ABSTRACT

A proposal is made for a label (1) which can be adhered to an article (5), more particularly to a beverage bottle, and can be detached again in a washing liquid at a washing temperature of at least 50° C., in the form of a laminate at least with the following layers: a biaxially stretched polymeric film layer (9) which shrinks at the washing temperature, a printed decoration layer (11), and an adhesive layer (13), more particularly a pressure-sensitive adhesive layer, for adhering the label (1) to the article (5). The polymeric film layer (9) is designed in such a way that in the laminate at the washing temperature within a maximum time span of less than 5 minutes, in particular less than 3 minutes, it attains degrees of contraction in its two stretching directions which differ from one another by less than 50% and are lower than 50%. As a result of this, whereas the adhesive force between the label (1) and the article (5) is high, the label (1) can be washed off from the article (5) without splitting.

24 Claims, 2 Drawing Sheets

(51) Int. Cl.

| | | |
|---|---|---|
| *G09F 3/10* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *C09J 5/06* | (2006.01) | |
| *C09J 7/29* | (2018.01) | |
| *B65C 3/26* | (2006.01) | |
| *G09F 3/00* | (2006.01) | |
| *B32B 7/12* | (2006.01) | |

(52) U.S. Cl.
CPC ............ *B32B 27/304* (2013.01); *B32B 27/32* (2013.01); *B32B 27/325* (2013.01); *B32B 27/36* (2013.01); *B65C 3/26* (2013.01); *C09J 5/06* (2013.01); *C09J 7/29* (2018.01); *G09F 3/04* (2013.01); *G09F 3/10* (2013.01); *B32B 2250/24* (2013.01); *B32B 2255/10* (2013.01); *B32B 2255/26* (2013.01); *B32B 2255/28* (2013.01); *B32B 2307/30* (2013.01); *B32B 2307/412* (2013.01); *B32B 2307/50* (2013.01); *B32B 2307/51* (2013.01); *B32B 2307/516* (2013.01); *B32B 2307/518* (2013.01); *B32B 2307/736* (2013.01); *B32B 2307/75* (2013.01); *B32B 2519/00* (2013.01); *C09J 2203/334* (2013.01); *C09J 2205/302* (2013.01); *C09J 2467/006* (2013.01); *G09F 2003/0257* (2013.01); *G09F 2003/0273* (2013.01); *Y10T 428/1352* (2015.01); *Y10T 428/24851* (2015.01)

(56) References Cited

U.S. PATENT DOCUMENTS

| | | | |
|---|---|---|---|
| 5,651,846 | A | 7/1997 | Hurst |
| 6,680,097 | B1 | 1/2004 | Amberger et al. |
| 2006/0251891 | A1 | 11/2006 | Aarnio |
| 2008/0026170 | A1 | 1/2008 | Yamada et al. |
| 2009/0038737 | A1 | 2/2009 | Previty et al. |
| 2009/0208682 | A1* | 8/2009 | Alfaro ............... C08J 5/18 428/34.9 |
| 2009/0218307 | A1* | 9/2009 | Davies ............. C09J 7/0296 215/365 |
| 2014/0124973 | A1 | 5/2014 | Alfaro et al. |

FOREIGN PATENT DOCUMENTS

| | | |
|---|---|---|
| EP | 0510403 A1 | 10/1992 |
| EP | 0326039 B1 | 11/1994 |
| EP | 0924678 B1 | 9/2004 |
| EP | 2127852 A1 | 2/2009 |
| GB | 2259291 A | 3/1993 |
| JP | 7-287525 A | 10/1995 |
| JP | 10-254362 A | 9/1998 |
| JP | 2000-178515 A | 6/2000 |
| JP | 2001-134189 A | 5/2001 |
| JP | 2002-241721 A | 8/2002 |
| JP | 2003-285842 A | 10/2003 |
| JP | 2004-279470 A | 10/2004 |
| JP | 2005-292195 A | 10/2005 |
| JP | 2006-15745 A | 1/2006 |
| JP | 2008-287096 A | 11/2008 |
| WO | 98/04409 A1 | 2/1998 |
| WO | 99/51432 A1 | 10/1999 |
| WO | 99/54860 A1 | 10/1999 |
| WO | 00/12288 A | 3/2000 |
| WO | 00/62273 A1 | 10/2000 |
| WO | WO 2006106309 A1 * | 10/2006 ............ C09J 7/0296 |
| WO | 2007/012169 A1 | 2/2007 |
| WO | 2007/090816 A1 | 8/2007 |
| WO | 2009067395 A1 | 5/2009 |

OTHER PUBLICATIONS

DIN 53369: Prüfung von Kunststoff-Folien, Bestimmung der Schrumpfkraft Deutsche Normen. DIN Norm, vol. 53369, Feb. 1, 1976 (Feb. 1, 1976), pp. 136-138, XP009129082 cited in the current application (English translation).

Response to an Office Action dated Mar. 31, 2016, in the parallel European Application 09 753 052.1 with attachment (29 pages).

Office Action dated May 9, 2013 in the corresponding Colombian Patent Application 11031617, 8 pgs.

Extended European Search Report cited in 171790603-1308, dated Oct. 26, 2017, 13 pages.

* cited by examiner

LABEL, ESPECIALLY FOR A REUSABLE CONTAINER

CROSS REFERENCE TO RELATED APPLICATION

This application is a continuation of U.S. Ser. No. 13/061,998, filed May 20, 2011, which is a 35 U.S.C. 371 National Phase Entry application from PCT/EP2009/061351, filed Sep. 2, 2009, which claims the benefit of German Patent Application No. 10 2008 045 547.4 filed on Sep. 3, 2008, the disclosures of which are incorporated herein in their entirety by reference.

DESCRIPTION

The invention relates to a label which is adapted to be adhered to an article, in particular a beverage bottle, and adapted to be detached in a washing liquid at a washing temperature of at least 50.degree. C.

In the beverage industry in particular, containers—bottles, for example—are used more than once. On each return, these reusable containers are cleaned prior to refilling, and even labels adhered to the container are washed off, before the containers are refilled and relabeled.

A label suitable for labeling reusable containers, more particularly beverage bottles, is known from EP 0 951 004 B1. The label is in the form of a laminate which comprises a biaxially stretched polymeric film layer which shrinks at the washing temperature, a printed decoration layer, and a pressure-sensitive adhesive layer for adhering the label to the container. In the hot washing liquid, the polymeric film layer shrinks, i.e., contracts, to overcome the holding force of the adhesive layer adhered to the container, and so the label parts from the container. The adhesive is a redispersible adhesive which on contact with the washing liquid becomes neutralized, i.e., loses its adhesive force, thereby preventing reattachment of the label to the container.

In a label of the kind known from EP 0 951 004 B1, the stretched polymeric film layer begins to shrink only when a certain initial temperature is reached. As the temperature increases, the energy stored in the stretched polymeric film as a result of the stretching operation is then partly or entirely released. Since the label is fixed on the container by the adhesion force of the pressure-sensitive adhesive, it is necessary to ensure that the contraction force which develops in the polymeric film exposed to the hot washing liquid exceeds the adhesion force by which the adhesive layer holds the label on the container.

In practice it has emerged that reusable containers, owing to different conditions of erosion and/or corrosion, have surface properties which vary, in some cases greatly, particularly if the surface of the reusable containers is coated in order to mask existing wear or to reduce future wear. A further factor is that the label is intended to adhere reliably to the varying surfaces under different storage conditions at temperatures, for example, between 2 and 55° C. and at different humidity levels (e.g., between 10% and 100% relative humidity), or, in the case of prelabeled bottles or bottles in the course of return, even under conditions of frost or strong solar irradiation. To accomplish this, the pressure-sensitive adhesive must achieve comparatively high levels of adhesion force. Nevertheless, the intention is that the label can be reliably detached under industrial conditions and as far as possible without mechanical detachment aids, such as brushes, for example.

It is an object of the invention to provide a label which can be adhered to an article, more particularly to a beverage bottle, and which can be detached again reliably in a washing liquid at a washing temperature in the range between about 50° C. and about 95° C., even when the adhesion force of the label is such that it is necessary to manage comparatively large fluctuations in adhesion force at the surface of the article bearing the label, in order to prevent unwanted detachment of the label from the article.

In the achievement of this object, the invention is based on a label which is adapted to be adhered to an article, more particularly a beverage bottle, and is adapted to be detached in a washing liquid at a mandated washing temperature in a temperature range between about 50° C. and about 95° C. The label is in the form of a laminate comprising at least the following layers:

a biaxially stretched polymeric film layer which shrinks (recontracts) at the washing temperature, a printed decoration layer, and an adhesive layer, more particularly a pressure-sensitive adhesive layer, for adhering the label to the article.

The achievement of the above object is characterized in that the polymeric film layer is designed such that the laminate, at the mandated washing temperature and within a maximum time span of less than 5 minutes, more particularly less than 3 minutes, and with the polymeric film layer being allowed to freely contract in its two stretching directions, achieves maximum degrees of contraction which differ from one another by less than 50%, and in that the stretched polymeric film layer is, further, designed in such a way that the laminate, in the two stretching directions of the polymeric film layer, at the mandated washing temperature and within the maximum time span, attains a contraction tension of at least 0.6 N/mm$^2$ and a degree of contraction of at least 0.5%.

The invention is based on the finding that it is important not only to increase the contraction force of the stretched polymeric film layer to a level which is sufficient to overcome the adhesion force of the adhesive layer but also to obey the time gradient with which the polymeric film layer and hence the laminate recontracts, i.e., shrinks, in the hot washing liquid.

It is important that the polymeric film layer in the laminate, if allowed to freely contract, shrinks in its two stretching directions in an at least approximately uniform manner, i.e., with a difference in degree of contraction of less than 50% (based on the higher degree of contraction). Within the maximum time span of less than 5 minutes and more particularly of less than 3 minutes dictated by the industrial wash removal technology, the degrees of contraction in the two stretching directions are to remain at advantageously less than 65%, but more particularly less than 50% (based on the stretched original condition). It is understood that the values for the degree of contraction and the contraction tension, respectively, that are mentioned here and below are the values which are achieved within the mandated maximum wash removal time span, and can also be exceeded if the wash removal time span is extended. Where values are reported here and below for the degree of contraction, the values in question are always those which develop on free contraction of the laminate, i.e., in a state in which the laminate is not adhered to the article.

Conventional shrinking labels negligibly shrink in machine direction, i.e., in the lengthwise direction of the stretched film utilized for label production, and generate a high degree of contraction within a short term, i.e., within a fraction of the predetermined maximum time span of, for example, 3 minutes. For example, a degree of contraction of 70% in the cross direction of the polymeric film is developed which allows a high tension in the laminate. This can lead to splitting in the layer construction of the label. In the case of the label of the invention, the difference in the degrees of contraction between the two stretching directions is limited to less than 50%. The extent of the degrees of contraction in the two stretching directions is limited to less than 65%, more particularly less than 50%, as well. Accordingly it is ensured that stresses in the laminate of the label do not develop suddenly, but instead develop gradually and with a distribution over the wash removal time span of 5 or 3 minutes. The wash removal time span is intended advantageously to be at least 2 minutes. Instances of stress splitting in the laminate, as for example in the ink layer of the decoration layer, which lead to residues, for example, of ink and pressure-sensitive adhesive on the article after the label has been detached, are avoided in this way.

The uniformity with which the contraction forces (contraction tensions) develop in both stretching directions is one of the factors contributing to the ability of the label to detach in both stretching directions within the wash removal time span of industrial washing installations, of 3 minutes, for example, without splitting of the label assembly, in spite of the degrees of contraction being reduced as compared with those of conventional labels. Since the degrees of contraction in the two stretching directions of the polymeric film layer have been at least approximately matched to one another, the ink materials of the decoration layer are less heavily compressed on contraction as compared with a substantially monoaxially stretched polymeric film layer, and this promotes the adhesion force of the ink material and prevents splitting.

It has emerged that a minimum threshold value of the degree of contraction of the polymeric film layer of 0.5% is sufficient to part the label from the container in the hot washing liquid if at the same time a contraction tension of at least 0.6 $N/mm^2$ is attained. The values in question, however, are threshold values, which may be exceeded in the wash removal operation. For the splitting-free detachment of the label, however, it is essential that also the progressive contraction of the polymeric film layer takes place in a controlled manner. It has emerged as being advantageous if the stretched polymeric film layer is designed in such a way that the laminate, in the two stretching directions of the polymeric film layer and within the maximum time span a) at a washing temperature of 60° C. does not exceed a contraction tension of maximally 3.5 $N/mm^2$ and a degree of contraction of maximally 20%, more particularly of maximally 13% and/or b) at a washing temperature of 70° C. does not exceed a contraction tension of maximally 15 $N/mm^2$, more particularly of maximally 12 $N/mm^2$, and a degree of contraction of maximally 55%, more particularly of maximally 36% and/or c) at a washing temperature of 80° C. does not exceed a contraction tension of maximally 18 $N/mm^2$ and a degree of contraction of maximally 60%, more particularly of maximally 46% and/or d) at a washing temperature of 90° C. does not exceed a contraction tension of maximally 20 $N/mm^2$ and a degree of contraction of maximally 65%, more particularly of maximally 50%.

The stated maximum values for the contraction tension and for the degree of contraction define, as a function of the washing temperature, limiting curves for the polymeric films that are suitable in the context of the invention.

For a wide range of applications with any of a very wide variety of different surface properties of the articles, the stretched polymeric film layer is preferably designed in such a way that in the laminate in its two stretching directions, at a washing temperature of at least 70° C. and within the maximum time span, a degree of contraction of at least 4% and a contraction tension of at least 1.5 $N/mm^2$ are attained. It has proven particularly favorable in this context if the stretched polymeric film layer in the laminate in its two stretching directions, and at a washing temperature of at least 80° C., within the maximum time span, attains a degree of contraction of at least 2% and a contraction tension of at least 0.8 $N/mm^2$. In this context it is possible to exploit the fact that at 80° C. the adhesion force of the adhesive will be smaller than at 70° C.

The polymeric film layer ought in both stretching directions to have a degree of contraction which, in both stretching directions, develops as uniformly as possible and ought to achieve a comparatively high contraction tension at the washing temperature. Having proven particularly suitable for this purpose are stretched polymeric film layers made from a plastics material based on polyethylene terephthalate (PET). Other polymers as well are suitable such as polyvinyl chloride (PVC), polystyrene (PS), polypropylene (PP), polyethylene (PE), polylactic acid (PLA) or cycloolefin copolymers (COC), for example.

The stretched polymeric film layer ought to be composed of a comparatively stiff material, in order to allow the decoration layer to be printed with particular precision and the label to be dispensed subsequently with exactness and speed onto the container. Advantageously the polymeric film layer has an elasticity modulus of at least 2500 MPa (particularly in the machine direction of the film strip), which can be achieved in particular with PET films.

The layer construction of the label may take place conventionally, as for example by the stretched polymeric film layer being a layer constituent of a film composite layer and being joined to at least one further polymeric film layer to form the film composite layer, in order to optimize the contraction force in the label on detachment. For this purpose the further polymeric film layer may be an unstretched or a monoaxially stretched polymeric film layer which recontracts on exposure to heat, but here as well the further polymeric film layer is preferably biaxially stretched. In the film composite layer the polymeric film layers may be joined in the manner of a laminate, as for example by means of a laminating adhesive or the like; alternatively they may be coextruded.

In one preferred embodiment, which can be used with labels other than the label explained above, the security against splitting of the label during wash removal is increased if the adhesive layer is composed in particular of a pressure-sensitive adhesive material, being formed of crosslinking polymer and being joined to the laminate via an interlayer which serves as an adhesion promoter and consists of crosslinking laminating adhesive. In this version the laminating adhesive crosslinks with the adhesive layer, and this increases the splitproofness. The interlayer preferably comprises as its base substance a two-component polyurethane adhesive. The adhesive layer advantageously comprises as its base substance an adhesive, more particularly a pressure-sensitive adhesive, which can be excited to crosslinking by radiation, as for example by electron beams, but more particularly by ultraviolet light.

The polymer film layer is composed advantageously of transparent plastics material, with the printed decoration layer being disposed in the laminate between the polymeric film layer and the adhesive layer, which is designed preferably as a pressure-sensitive layer, in order to protect the decoration layer from mechanical damage. Alternatively the decoration layer and the adhesive layer or pressure-sensitive adhesive layer may be disposed on opposite sides of the stretched polymeric film layer, in which case the decoration layer is disposed advantageously between the stretched polymeric film layer and a protective layer which finishes off the label toward the outside. The protective layer may be a polymeric film layer and more particularly may be a polymeric film layer which is able to shrink monoaxially or biaxially on exposure to heat. Alternatively the protective layer may be a varnish layer, more particularly comprising a crosslinking material, and preferably a two-component material.

In a second aspect the invention relates to a container having a label of the invention adhered thereto, and in a third aspect the invention also relates to a method of adhering a label of the invention to an article, more particularly to a beverage bottle.

Below, exemplary embodiments of the invention are explained in more detail with reference to a drawing. In that drawing FIG. 1 shows a container with a label in accordance with the invention adhered to its outer periphery at the beginning of detachment in a washing liquid;

Figure 1:
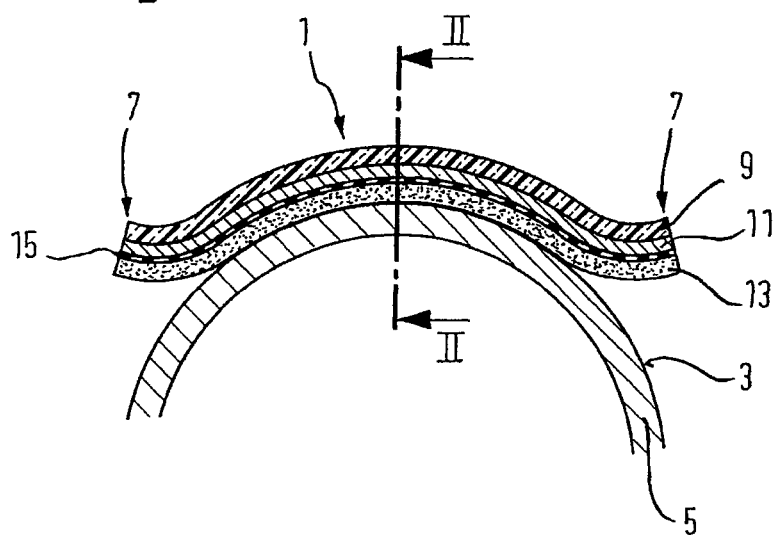
Figure 2:
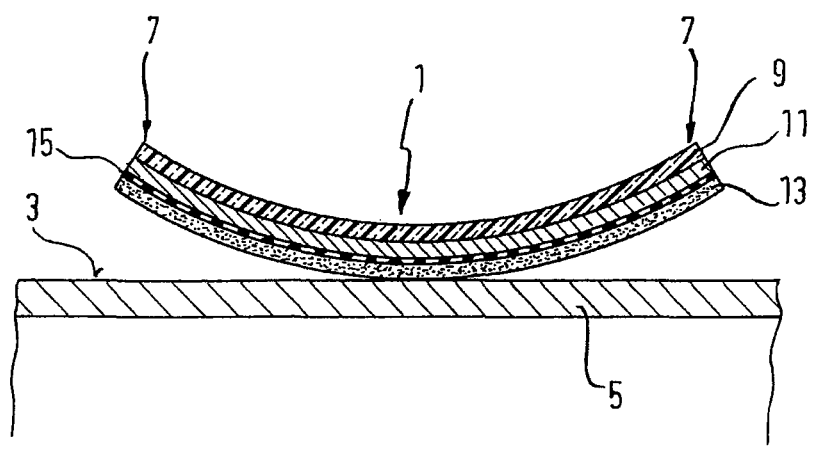
FIG. 2 shows a section through the container and the label, viewed along a line II-II in FIG. 1.

FIGS. 1 and 2 show a label, designated generally by 1, which is adhered to a substantially cylindrical outer surface 3 of a container 5, as for example of a multi-use beverage bottle, in a condition in which the label 1 is beginning to detach, almost simultaneously from all four edges 7, in a hot washing liquid (not shown). In the condition before the detachment of the label 1, it is adhered up to the edges 7 to the surface 3 of the container 5.

The label 1 is designed as a laminate and has a biaxially stretched polymeric film layer 9 which shrinks, i.e., contracts, in both stretching directions at the washing temperature of the washing liquid of, for example, about 80° C. The layer 9 is composed of transparent plastics material and bears, on its side facing the container 5, a printed decoration layer 11, which is visible from the outside through the polymeric film layer 9. Applied to the decoration layer 11 is an adhesive layer 13 composed of a pressure-sensitive adhesive material, which bonds the label 1 to the container 5.

The polymeric film layer 9 is preferably composed of a polyethylene terephthalate (PET) plastics material which is biaxially stretched and which in both of its stretching directions has maximum degrees of contraction which differ, when the polymeric film material is heated in the washing liquid, while allowing free contraction of the laminate, by less than 50% (based on the higher degree of contraction). The degree of contraction in each of the two stretching directions is less than 65%, more particularly less than 50% (based on the stretched original condition). The polymeric film layer 9 is configured such that the stated values are achieved within a washing time span of approximately 5 minutes, advantageously of about 3 minutes, which is customary for reusable containers in industrial washing installations.

Since the build-up in contraction tension is distributed on both stretching directions of the polymeric film layer 9 over the entire washing time span, and since the contractions which develop approximately uniformly in both stretching directions are restricted, the generation of stresses by the contraction process that may lead to splitting of the detaching label into a detaching part and a remnant part remaining on the container is prevented. Because the detachment procedure takes place in a controlled way in both stretching directions, labels can be detached without splitting even when the adhesive layer 13 is designed for comparatively high adhesion forces, in order to prevent unwanted detachment of the label 1 from bottles having different surface properties.

The contraction parameters of the polymeric film layer 9 are set such that the laminate in the two stretching directions of the polymeric film layer 9, during the washing time span and at a washing temperature of at least 50° C., attains a contraction tension of at least 0.6 N/mm$^2$ with a degree of contraction of at least 0.5%. It has been found that, if these parameters are observed, the label can be washed off on the basis of the biaxial stretching of the polymeric film material.

It is understood that in actual practice the values for contraction tension and degree of contraction that are selected may also be higher, in order to increase the reliability of detachment. Also the washing temperature in many cases can be selected to be higher than 50° C. In order to be able to detach the label without splitting, however, maximum values for the contraction tension and the degree of contraction ought not to be exceeded. It has emerged as being suitable if the polymeric film layer 9 is designed such that the laminate in the two stretching directions of the polymeric film layer, within the mandated wash removal time span of, for example, 3 minutes at a washing temperature of 60° C., does not exceed a contraction tension of maximally 3.5 N/mm$^2$ and a degree of contraction of maximally 20%, but more particularly maximally 13%. At a washing temperature of 70° C. the contraction tension should be below a maximum of 15 N/mm$^2$, in particular below a maximum of 12 N/mm$^2$, while the degree of contraction should be maximally 55%, more particularly maximally 36%. At a washing temperature of 80° C., the contraction tension ought not to exceed a value of maximally 18 N/mm$^2$ and a degree of contraction of maximally 60%, in particular maximally 46%. In the case of a washing temperature of 90° C., the contraction tension ought not to exceed maximally 20 N/mm$^2$ and a degree of contraction of maximally 65%, more particularly maximally 50%.

There should also be certain minimum threshold values achieved for the contraction tension, in order to improve the reliability of detachment as a function of the washing temperature. At a washing temperature of 70° C., for instance, the polymeric film layer 9 ought in its two stretching directions to obtain a degree of contraction of at least 4% for a contraction tension of at least 1.5 N/mm$^2$ during a washing time span of 3 minutes. In the case of a washing temperature of 80° C., the degree of contraction achieved in both stretching directions within the washing time span of 3 minutes ought to be at least 2%, and the contraction tension achieved under the same conditions ought to be at least 0.8 N/mm$^2$.

Depending on the washing temperature, the degree of contraction of the polymeric film layer 9 is less directionally dependent and considerably smaller than the degree of contraction of the polymeric film layer of conventional labels that are removable by washing, as shown by Table below for PET films:

TABLE 1

| Washing temperature [° C.] | Invention Degree of contraction [%] | | Prior art Degree of contraction [%] | |
|---|---|---|---|---|
| | crosswise | lengthwise | crosswise | lengthwise |
| 60° | −1.1 | −1.4 | −23.8 | −5.1 |
| 65° | −3.6 | −3.8 | −63.7 | 1.8 |
| 70° | −11 | −10.2 | −64.9 | 1.3 |
| 75° | −17.5 | −15.0 | −65.3 | −0.6 |
| 80° | −22.5 | −17.7 | −69.1 | −1.1 |
| 85° | −24.8 | −18.8 | −69.4 | −3.8 |
| 90° | −27.5 | −19.8 | −73.2 | −4.3 |
| 95° | −30.3 | −21.7 | −75.1 | −5.2 |

The free contraction of the films was determined, by immersing the films for three minutes in water at the corresponding temperature.

The degree of contraction in lengthwise direction is the degree of contraction in the longitudinal film web direction of the film production machine. The degree of contraction in the crosswise direction identifies the degree of contraction transverse to the longitudinal machine direction.

Table 2 shows the maximum contraction tension of a PET film approximately 50 μm thick, as used in accordance with the invention, in comparison to a PET film of the prior art. The maximum contraction tension developed on the PET film in accordance with the invention in both stretching directions is greater than the maximum contraction tension of conventional films. The table shows the maximum contraction tensions in comparison. The contraction tension is determined in accordance with DIN 53 369, the temperature being altered linearly at 20° K/h from 30 to 105° C. in a measurement chamber, instead of the DIN change rate of 50 or 120° K/h. With a rate of change of 20° K/h, the residence time is approximately 3 minutes at a temperature which is representative of the washing temperature.

TABLE 2

| PET film 50 μm thick | | |
|---|---|---|
| Maximum contraction tension | crosswise [N/mm$^2$] | lengthwise [N/mm$^2$] |
| Invention | 12.9 | 9.1 |
| Prior art | 8.7 | 0 |

The above measurements in Table 1 show that the beginning of contraction of the polymeric film layer utilized in the context of the invention is located at a higher temperature than in the case of conventional, stretched, shrinkable polymeric films, in this case at about 65° C. in contrast to conventional films, which begin to contract at only about 55 to 60° C.

In the case of the label 1 shown in FIGS. 1 and 2, the printed decoration layer 11, as viewed from the outside, is protected beneath the polymeric film layer 9, which where appropriate may also serve as a production carrier for the label. The adhesive layer 13 may be applied directly to the ink layer 11. Preferably, however, there is an interlayer 15 as an adhesive promoter between decoration layer 11 and the adhesive layer 13. The interlayer 15 may be a conventional primer layer. Preferably, the interlayer 15 is a reactive layer of two-component polyurethane laminating adhesive, which is able to crosslink not only with the decoration layer 11 but also with the adhesive layer 13. Advantageously the adhesive layer 13 is likewise composed of crosslinking polymer, more particularly of a crosslinking system which can be excited by radiation, such as, for example, UV-excitable adhesive material. The interlayer 15 raises the splitting resistance of the label 1.

In the text below, variants of the label of FIGS. 1 and 2 are illustrated. Components having an equivalent effect are identified with the reference numbers of FIGS. 1 and 2, and to distinguish them are given a letter. For elucidation of the construction, the mode of action, and any variants, reference is made to the description of FIGS. 1 and 2.

Figure 3:
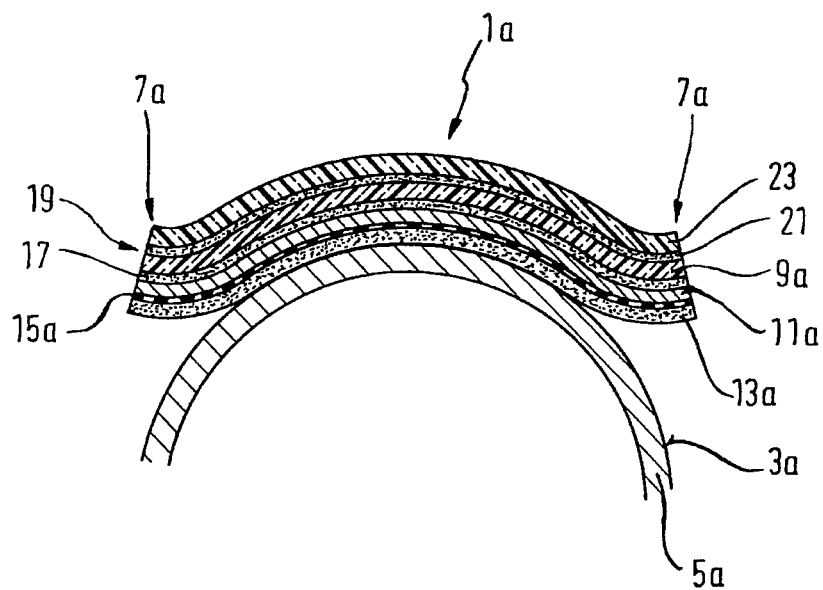
FIG. 3 shows a sectional view through a variant of the label from FIG. 1, at the beginning of detachment.

FIG. 3 shows a label 1a adhered to the outer surface 3a of the container 5a at the beginning of the detachment procedure. In contrast to the label 1 of FIGS. 1 and 2, the decoration layer 11a is printed via a primer layer 17 onto the biaxially stretched polymeric film layer 9a. In this example as well the decoration layer 11a is disposed between the adhesive layer 13a and the polymeric film layer 9a. The biaxially stretched polymeric film layer 9a is a constituent of a laminate composite layer 19 in which the biaxially stretched polymeric film layer 9a is joined two-dimensionally via an adhesive layer 21, for example, of laminating adhesive, to a further polymeric film layer 23. The overall laminate composite layer 19 is transparent, and so the decoration layer 11a remains visible from the outside. Through the lamination of the layers 9a and 23 it is possible to increase the contraction force of the label 1a if the polymeric film layer 23 is a monoaxially stretched film or, as is preferred in order to lessen the stresses in the assembly of materials, is likewise a biaxially stretched film. It is understood that the polymeric film layer 23 may also be of a non-shrinking design. In that case the contraction force of the label 1a would be reduced. If layers 9a and 23 which contract differently are laminated, the direction of the detachment movement of the label on contraction may be influenced and the detachment behavior may be improved.

Figure 4:
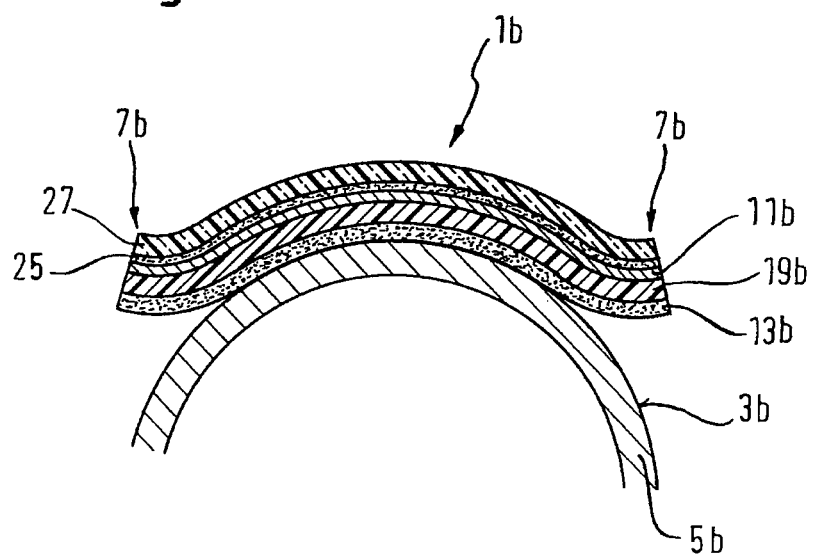
FIG. 4 shows a further variant of the label from FIG. 1, at the beginning of detachment.

In the labels explained above, the decoration layer in the laminate is located between the biaxially stretched polymeric film layer and the adhesive layer. In the case of the label 1b of FIG. 4, the adhesive layer 13b is attached directly, or else, if appropriate, via an adhesive promoter layer, to the biaxially stretched polymeric film layer 9b, while the decoration layer 11b is printed onto the opposite side of the polymeric film layer 9b, which here as well serves as a production carrier. Attached to the decoration layer 11b via an adhesion promoter layer 25, e.g., a laminated adhesive layer, is a protective layer 27. The protective layer 27 may be a layer of protective varnish, or else a further, stretched or unstretched, polymeric film layer. Here as well the polymeric film layer may be biaxially or monoaxially stretched. Where the protective layer 27 is configured as a layer of protective varnish, there is no need for an adhesion promoter layer 25, e.g., a layer of laminating adhesive between the protective layer 27 and the decoration layer 11b. An option would be the use of an adhesion promoter layer in the form of a primer on the polymeric film layer 9b. In such a case the decoration layer 11b and the adhesion promoter layer 25 switch their positions with one another in FIG. 4.

If a polymeric film is used as protective layer 27, the decoration layer 11b may also be applied to that polymeric film, and may be fixed to the polymeric film layer 9b via the adhesion promoter layer 25, more particularly a layer of laminating adhesive.

The invention claimed is:

1. A label adapted to be adhered to an article and adapted to be detached in a washing liquid at a mandated washing temperature from a temperature range between 50° C. and 95° C., the label being in the form of a laminate comprising at least the following layers:
   a polymeric film layer being biaxially stretched in two stretching directions and being adapted to recontract in the two stretching directions at the mandated washing temperature,
   a printed decoration layer, and
   an adhesive layer for adhering the label to the article,
   wherein the polymeric film layer is designed such that the laminate, at the mandated washing temperature and within a maximum time span of less than 5 minutes and with the polymeric film layer being allowed to freely contract in the two stretching directions, achieves maximum degrees of contraction in the two stretching directions which are equal or achieves maximum degrees of contraction in the two stretching directions which are different from each other with a lower maximum degree of contraction differing by less than 50% from a higher maximum degree of contraction,
   wherein the stretched polymeric film layer is designed in such a way that the laminate, in the two stretching directions of the polymeric film layer, when subjected to a washing temperature of 80° C. and within the maximum time span, attains a contraction tension of maximally 18 N/mm$^2$, and when subjected to a washing temperature of 60° C. and within the maximum time span, attains a contraction tension of maximally 3.5 N/mm$^2$.

2. The label of claim 1, wherein the polymeric film layer is designed such that the laminate, at the mandated washing temperature and within the maximum time span and on free contraction in the two stretching directions of the polymeric film layer, achieves maximum degrees of contraction which are lower than 65%.

3. The label of claim 2, wherein the polymeric film layer is designed such that the laminate achieves in the two stretching directions maximum degrees of contraction of less than 50%.

4. The label of claim 1, wherein the maximum time span is less than 3 minutes.

5. The label of claim 1, wherein said adhesive layer is a pressure-sensitive adhesive layer.

6. The label of claim 1, wherein said article is a beverage bottle.

7. The label of claim 1, wherein the stretched polymeric film layer is designed in such a way that the laminate, in the two stretching directions of the polymeric film layer and within the maximum time span,
   a) when subjected to a washing temperature of 60° C. does not exceed a contraction tension of maximally 3.5 N/mm$^2$ and a degree of contraction of maximally 20%, and/or
   b) when subjected to a washing temperature of 70° C. does not exceed a contraction tension of maximally 15 N/mm$^2$ and a degree of contraction of maximally 55%, and/or
   c) when subjected to a washing temperature of 80° C. does not exceed a contraction tension of maximally 18 N/mm$^2$ and a degree of contraction of maximally 60%, and/or
   d) when subjected to a washing temperature of 90° C. does not exceed a contraction tension of maximally 20 N/mm$^2$ and a degree of contraction of maximally 65%.

8. The label of claim 7, wherein the stretched polymeric film layer is designed in such a way that the laminate, in the two stretching directions of the polymeric film layer and within the maximum time span,
   a) when subjected to a washing temperature of 60° C. does not exceed a contraction tension of maximally 3.5 N/mm$^2$ and a degree of contraction of maximally 13%, and/or
   b) when subjected to a washing temperature of 70° C. does not exceed a contraction tension of maximally 12 N/mm$^2$ and a degree of contraction of maximally 36%, and/or
   c) when subjected to a washing temperature of 80° C. does not exceed a contraction tension of maximally 18 N/mm$^2$ and a degree of contraction of maximally 46%, and/or
   d) when subjected to a washing temperature of 90° C. does not exceed a contraction tension of maximally 20 N/mm$^2$ and a degree of contraction of maximally 50%.

9. The label of claim 1, wherein the stretched polymeric film layer is formed of a plastics material based on polyethylene terephthalate (PET) or polyester or polyvinyl chloride (PVC) or polystyrene (PS) or polypropylene (PP) or polyethylene (PE) or polylactic acid (PLA) or cycloolefin copolymer (COC).

10. The label of claim 9, wherein the stretched polymeric film layer has an elasticity modulus of at least 2500 MPa.

11. The label of claim 10, wherein the adhesive layer comprises as its base substance an adhesive which is adapted to be excited to crosslinking by radiation.

12. The label of claim 11, wherein said radiation is ultraviolet light.

13. The label of claim 1, wherein the stretched polymeric film layer is a layer constituent of a film composite layer in the form of a laminate composite layer or a coextruded composite layer, wherein the film composite layer comprises at least one further polymeric film layer in the form of a monoaxially or biaxially stretched polymeric film layer which contracts on exposure to heat.

14. The label of claim 1, wherein the adhesive layer is formed of a crosslinking polymer, and is joined via an interlayer of crosslinking laminating adhesive to one layer of the laminate other than said adhesive layer.

15. The label of claim 14, wherein the interlayer comprises two-component polyurethane adhesive as its base substance.

16. The label of claim 1, wherein the stretched polymeric film layer is composed of transparent plastics material, and the printed decoration layer is disposed between the stretched polymeric film layer and the adhesive layer.

17. The label of claim 1, wherein the decoration layer and the adhesive layer are disposed on opposite sides of the stretched polymeric film layer, and the decoration layer is disposed between the stretched polymeric film layer and a protective layer.

18. The label of claim 17, wherein the protective layer is designed as a protective layer or as a polymeric film layer.

19. The label of claim 18, wherein the protective layer is a monoaxially or biaxially stretched, polymeric film layer which is adapted to contract on exposure to heat.

20. A container in the form of a beverage bottle, wherein a label of claim 1 is adhered to the container.

21. A method of adhering a label to an article and detaching the label from the article, wherein the label is adapted to be adhered to the article and is in the form of a laminate with at least the following layers:
- a polymeric film layer being biaxially stretched in two stretching directions and being adapted to recontract in the two stretching directions when exposed to heat,
- a printed decoration layer, and
- an adhesive layer for adhering to the article, wherein the label is adhered by its adhesive layer to the article, and
- wherein said label can be treated for the purpose of detachment of the label, with a washing liquid which has a mandated washing temperature in the range between 50° C. and 95° C., such that the polymeric film layer recontracts and, in so doing, overcomes the adhesive force of the adhesive layer,
- wherein the polymeric film layer is designed such that the laminate, at the mandated washing temperature and within a maximum time span of less than 5 minutes and with the polymeric film layer being allowed to freely contract in the two stretching directions achieves maximum degrees of contraction in the two stretching directions which are lower than 65%,
- and achieves a maximum degree of contraction in a first one of the two stretching directions which is less than 50% of the maximum degree of contraction in a second one of the two stretching directions,
- wherein the polymeric film layer is designed in such a way that the laminate, in the two stretching directions, at the mandated washing temperature and within the maximum time span, attains a contraction tension of at least 0.6 N/mm² and a degree of contraction of at least 0.5%, wherein when subjected to a washing temperature of 60° C. and within the maximum time span, attains a contraction tension of maximally 3.5 N/mm².

22. The method of claim 21, wherein the polymeric film layer is designed in such a way that the laminate, in the two stretching directions of the polymeric film layer and within the maximum time span, a) when subjected to a washing temperature of 60° C. does not exceed a contraction tension of maximally 3.5 N/mm² and a degree of contraction of maximally 20%, and/or
b) when subjected to a washing temperature of 70° C. does not exceed a contraction tension of maximally 15 N/mm², more particularly of maximally 12 N/mm2, and a degree of contraction of maximally 55%, and/or
c) when subjected to a washing temperature of 80° C. does not exceed a contraction tension of maximally 18 N/mm² and a degree of contraction of maximally 60%, and/or
d) when subjected to a washing temperature of 90° C. does not exceed a contraction tension of maximally 20 N/mm² and a degree of contraction of maximally 65%.

23. The method according to claim 21, wherein the stretched polymeric film layer is designed in such a way that the laminate, in the two stretching directions of the polymeric film layer and within the maximum time span, at a washing temperature of at least 70° C. exceeds a contraction tension of at least 1.5 N/mm2 and a degree of contraction of at least 4%.

24. The method according to claim 21, wherein the stretched polymeric film layer is designed in such a way that the laminate, in the two stretching directions of the polymeric film layer and within the maximum time span, a) when subjected to a washing temperature of at least 70° C. exceeds a contraction tension of at least 1.5 N/mm² and a degree of contraction of at least 4%, and/or
b) when subjected to a washing temperature of at least 80° C. exceeds a contraction tension of at least 0.8 N/mm² and a degree of contraction of at least 2%.

* * * * *